United States Patent Office 2,702,300

Patented Feb. 15, 1955

2,702,300

SEPARATION OF THE REACTION PRODUCTS FORMED IN THE PRODUCTION OF ACRYLONITRILE FROM ACETYLENE AND HYDROCYANIC ACID

Rudolf Keller, Mannheim, Ernst Keyssner, Ludwigshafen (Rhine), and Peter Pfaff, Neustadt (Haardt), Germany, assignors to Badische Anilin- & Soda-Fabrik Aktiengesellschaft, Ludwigshafen am Rhine, Germany No Drawing. Application December 4, 1951, Serial No. 259,892

Claims priority, application Germany December 9, 1950

4 Claims. (Cl. 260—465.3)

This invention relates to a new process for the separation of the reaction products in the production of acrylonitrile from acetylene and hydrocyanic acid. More particularly it relates to a process for separating the reaction products in the production of acrylonitrile from acetylene and hydrocyanic acid from the unconverted initial materials by washing the gas mixture leaving the reaction chamber with an organic liquid.

In the production of acrylonitrile from acetylene and hydrocyanic acid with the aid of liquid or solid catalysts, a series of organic by-products are formed some of which have their origin in the formation of monovinylacetylene.

In the said process the two reactions:

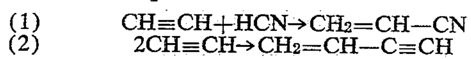

$$(1)\quad CH\equiv CH + HCN \rightarrow CH_2=CH-CN$$
$$(2)\quad 2CH\equiv CH \rightarrow CH_2=CH-C\equiv CH$$

proceed concurrently in such a way that when there is an excess of hydrocyanic acid the Reaction 1 is predominant and the formation of monovinylacetylene according to Equation 2 is suppressed, but not entirely suppressed. The monovinylacetylene formed readily reacts further and, when for example an acid cuprous chloride solution is employed for the production of the acrylonitrile, it reacts with acetylene to form divinylacetylene, with hydrocyanic acid to form cyanobutadiene and with hydrochloric acid to form chlorbutadiene. Moreover acetaldehyde is also formed which may react with hydrocyanic acid to form lactic acid nitrile. For this reason it is necessary to avoid the formation of monovinylacetylene as far as possible by maintaining a definite hydrocyanic acid concentration, but this is only practicable to a certain degree because too high doses of hydrocyanic acid reduce the efficiency of the catalyst.

In the industrial operation of the acrylonitrile synthesis, the excess of acetylene is returned as a so-called circulating gas to the reaction chamber and it is necessary to carry out a careful removal of the monovinylacetylene and the other by-products in order not to increase the content of by-products.

For the separation of the reaction products from the circulating gas it has also been proposed to subject the gas mixture to strong cooling to about −70° C., whereby all the constituents except acetylene are condensed, and then to carry out a distillation of the reaction products.

It is also known that the acrylonitrile together with the other hydrophilic constituents of the gas mixture, as for example hydrocyanic acid and acetaldehyde, can be removed by washing with water. Mono- and divinylacetylene are then condensed by strong cooling after previous drying of the gas mixture.

We have now found that the acrylonitrile and the by-products, as for example mono- and di-vinylacetylene, acetaldehyde and the like, formed by the reaction of acetylene and hydrocyanic acid can be separated in a specially advantageous manner from the excess acetylene by washing the gas mixture leaving the reaction chamber with an indifferent organic liquid having a boiling point of at least 60° C. and a neutral reaction. The boiling point of the washing liquids should preferably not exceed 300° C.

As such washing liquids are employed organic liquids which do not react with the substances contained in the circulating gas and which do not impair the formation of acrylonitrile in the reaction chamber into which they pass corresponding to their vapor pressure. Suitable liquids are for example aliphatic or cyclic hydrocarbons, such as petroleum products, paraffin oil, toluene, xylene, and tetrahydronaphthalene, and further monohydric and polyhydric alcohols, such as methyl alcohol, ethyl alcohol, propyl alcohol, butyl alcohol, octyl alcohol, decyl alcohol, benzyl alcohol, and ethylene glycol. It is also possible to employ halogenated hydrocarbons, such as trichlorethylene, tetrachlorethane, hexachlorbutane, and chlorobenzene, or esters, ethers or acetals as washing liquids. Suitable esters are, for example, butyl acetate, dibutyl phthalate, dioctyl phthalate, and ethylene glycol acetate. Suitable ethers are the monomethyl ethylene glycol ether, dioctyl ether, and dibenzyl ether. As examples for suitable acetals the acetals from acetaldehyde and butyl or octyl alcohol may be mentioned.

A preferred embodiment of the process consists in using acrylonitrile, preferably supercooled from −10° to +10° C., as washing liquid; from the circulating gas leaving the reaction tower there is thus condensed out the acrylonitrile formed and the by-products are dissolved out. Other nitriles, such as acetonitrile, propionitrile, lactonitrile, and benzonitrile may be also used as washing agents. Indifferent heterocyclic substances with a neutral reaction may also be employed as washing liquids. Such heterocyclic substances are for example tetrahydrofurane, γ-butyrolactone, and γ-butyrolactame.

The most favorable temperatures for carrying out the process lie between 0°–30° C., but it is also possible to employ washing liquids cooled at lower temperatures, for example at −25° C. The gas mixture leaving the reaction chamber is preferably cooled to room temperature before it is submitted to the washing process.

The recovery of the acrylonitrile and the separation of the by-products may be effected by fractional distillation. In the case of washing liquids which are not miscible with water, the acrylonitrile can also be extracted by means of water. When employing water-soluble washing liquids, such as acrylonitrile, butyl alcohol or tetrahydrofurane, a second washing of the circulating gas with water may be interposed in order to remove from the circulating gas the washing liquids which are contained therein corresponding to their vapor pressure.

The washing process is preferably carried out in countercurrent in a tower charged with filler bodies.

In the case of liquids having a low dissolving action, this action may be increased by using increased pressure.

The following examples will further illustrate how this invention can be carried out in practice, but the invention is not restricted to these examples.

*Example 1*

50 litres of circulating gas having a monovinylacetylene content of about 5% are withdrawn per hour from an apparatus in which acrylonitrile is produced from acetylene and hydrocyanic acid by means of a cuprous chloride solution, and washed with butanol in a tower filled with Raschig rings. The amount of butanol employed is 20 litres per hour. The washed circulating gas is led through a condensation vessel cooled to about −60° C. Only traces of monovinylacetylene can be detected in the deposited condensate, which consists mainly of butanol and dissolved acetylene. The butanol used for the washing, which leaves the washing tower, is worked up by fractional distillation. The low boiling fraction obtained consists of the dissolved acetylene, monovinylacetylene and acetaldehyde. After driving off the acrylonitrile formed, the butanol is recovered and returned to the washing tower. The residue in the still contains the lactic acid nitrile formed from acetaldehyde and excess hydrocyanic acid.

*Example 2*

75 litres of the circulating gas as in Example 1 are washed per hour in a tower filled with Raschig rings with acrylonitrile cooled at 0° C. 3 litres of the cooled acrylonitrile are used as washing liquid hourly. For preventing the warming of the washing liquid the washing tower is furnished with a jacket and cooled at 0° C. The acrylonitrile content of the circulating gas leaving the washing tower is 0.1 gram per litre corresponding to a tension of the acrylonitrile at 0° C. from 32Torr. In a second washing tower the circulating gas is washed with water from room temperature for extracting the acrylonitrile. There are used two litres of water per hour. The gas leaving the second tower is free from acrylonitrile, monovinylacetylene and acetaldehyde.

In the distillation of the washing liquid it is necessary to pass the fraction which contains the acrylonitrile through a separator in order to separate the azeotropically entrained water. The amount of acrylonitrile used as washing liquid increases in accordance with the acrylonitrile formed in the reaction chamber. This excess is removed from the washing liquid.

*Example 3*

Hourly 60 to 70 litres of the same circulating gas as in Example 1 are washed in a tower filled with Raschig rings with 2.0 to 2.5 litres of octyl alcohol from room temperature. The gas leaving the top of the washing tower is free from acrylonitrile, monovinylacetylene and acetaldehyde. In consequence of the low tension of the washing liquid the gas practically is also free from octyl alcohol.

*Example 4*

As in Example 1 the gas mixture is washed with mineral oil having a boiling range from 130 to 150° C. There are 5 litres of mineral oil used per hour. The mineral oil has also a good separating capacity, and the acrylonitrile, the monovinylacetylene, and the acetaldehyde are practically completely extracted from the circulating gas.

What we claim is:

1. A process for the separation of the reaction products in the production of acrylonitrile from acetylene and hydrocyanic acid from the unconverted initial materials which comprises washing the gas mixture leaving the reaction chamber with acrylonitrile without a preceding separation of the formed acrylonitrile, said acrylonitrile washing liquid being maintained separate from the catalyst used for the production of acrylonitrile and being maintained during washing at a temperature of about —25° C. to 30° C.

2. A process for the separation of the reaction products in the production of acrylonitrile from acetylene and hydrocyanic acid from the unconverted initial materials, which comprises washing the gas mixture leaving the reaction chamber first with acrylonitrile without a preceding separation of the formed acrylonitrile, said acrylonitrile washing liquid being maintained separate from the catalyst used for the production of acrylonitrile and being maintained during washing at a temperature of about —25° C. to 30° C., and then in a second washing process with water.

3. A process for the separation of the reaction products in the production of acrylonitrile from acetylene and hydrocyanic acid from the unconverted initial materials which comprises washing the gas mixture leaving the reaction chamber first with acrylonitrile of from —10° C. to 10° C. without a preceding separation of the formed acrylonitrile, said acrylonitrile washing liquid being maintained separate from the catalyst used for the production of acrylonitrile, and then with water of room temperature.

4. A process for the separation of the reaction products in the production of acrylonitrile from acetylene and hydrocyanic acid from the unconverted initial materials which comprises washing the gas mixture leaving the reaction chamber in countercurrent with acrylonitrile without a preceding separation of the formed acrylonitrile, said acrylonitrile washing liquid being maintained separate from the catalyst used for the production of acrylonitrile and being maintained during washing at a temperature of about —25° C. to 30° C.

References Cited in the file of this patent

UNITED STATES PATENTS

| | | |
|---|---|---|
| 2,385,327 | Bradley et al. | Sept. 25, 1945 |
| 2,579,638 | Zwilling et al. | Dec. 25, 1951 |
| 2,621,204 | MacLean et al. | Dec. 9, 1952 |